Aug. 2, 1960   C. L. VICE ET AL   2,947,067
METHOD OF MANUFACTURE OF FLEXURE MEMBER
Filed Dec. 9, 1957

INVENTOR.
CHARLES L. VICE
PETER V. H. SERRELL
BY
ATTORNEYS

United States Patent Office 2,947,067
Patented Aug. 2, 1960

2,947,067

METHOD OF MANUFACTURE OF FLEXURE MEMBER

Charles L. Vice, San Marino, and Peter V. H. Serrell, Pasadena, Calif., assignors to Sandberg-Serrell Corporation, Pasadena, Calif., a corporation of California Filed Dec. 9, 1957, Ser. No. 701,540

6 Claims. (Cl. 29—173)

This invention relates to coupling devices of the type which permit a pivot action but more particularly to an improvement of such devices known as flexures and a method of making them.

In using previously known techniques for making flexures, various operations are involved. One known process includes the steps of forming a blank from standard stock material, heat treating the blank to secure a spring temper, grinding the blank to form blade areas of a given thickness, joining two blanks thus finished so that transverse blade centers of each blank are aligned, and grinding the pair of blanks thus joined to secure the desired external dimensions. Where the steps of the process can be simplified, the costs of manufacturing may be decreased. It is an object of this invention to provide an improved flexure and to simplify the manufacturing process, thereby reducing manufacturing costs.

According to the process of the present invention, a flexure is made by commencing with a piece of standard stock material having a shape appropriate to the mounting or installation of the finished flexure. A hole is formed through the center using a drill or machine tools, whichever is preferred. Two or more grooves are formed within the block along the hole. These grooves may be formed by any suitable process, but one satisfactory way is to use a tool such as a broach. One or more thin blades which have been properly shaped are inserted in the groove or grooves and secured thereto by brazing. Subsequent to brazing the assembly is heat treated to develop the desired strength of the blades. Finally the original piece of standard stock material is divided in such a way as to leave two appropriately shaped blocks of material joined by the thin blade or blades. The resulting novel flexure is ready for use and holes may be made in the remaining portions of the original block or material to facilitate mounting the flexure with screws or bolts.

These and other features of the manufacturing process and product of this invention may be more fully appreciated when considered in the light of the following specification and drawings in which.

Figure 1:
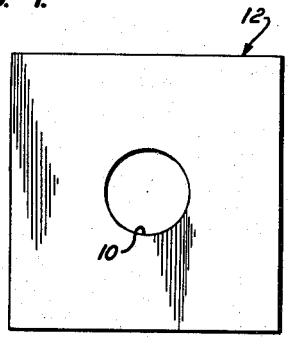
Figs. 1 through 4 show a flexure in the various steps of its manufacture.
Figure 2:
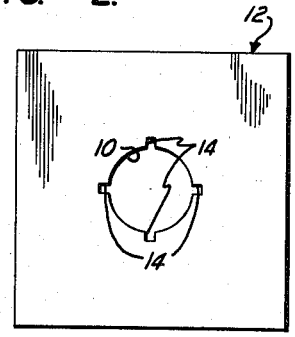

Referring to Fig. 1, the first step in the novel method of manufacturing flexures according to this invention is illustrated. A hole 10 is made in a standard piece of material 12 which is preferably iron or steel although other metals are equally suitable. A tool of proper size such as a broach having appropriately spaced cutting edges is driven through the hole 10 in Fig. 1. By this operation one or more pairs of grooves such as the two pairs of grooves 14 in Fig. 2 are formed in the piece of material 12.

Figure 4:
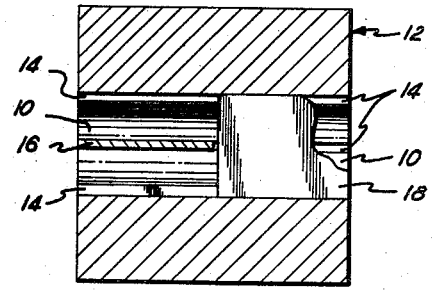
Figure 5:
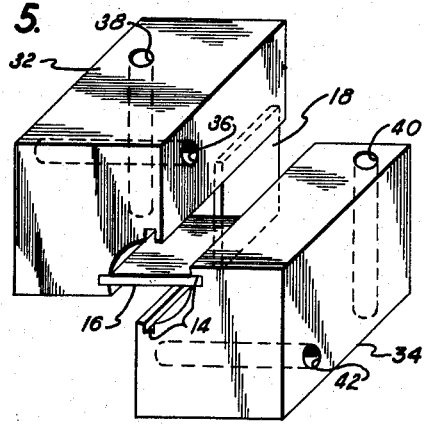
Fig. 5 illustrates in perspective a flexure according to the present invention.

The next step is to insert one or more blade members in the piece of material which, as pointed out subsequently, provide a flexing action. For illustrative purposes, two blades are arbitrarily selected for the flexure in Figs. 3, 4 and 5. A pair of thin blade members 16 and 18 are inserted in the grooves 14 in the manner shown in Figs. 3 and 4, Fig. 4 being a cross-sectional view taken on the line 4—4 in Fig. 3. As more clearly seen in Fig. 4, the blades 16 and 18 extend inwardly through the hole 14 almost to the center, but they are slightly separated from each other in order to avoid frictional engagement. While the blades are shown of equal length, width and thickness, it is pointed out that this need not be so, for the blades may be of unequal length, width, thickness or any combination of different dimensions. It may be desirable in some instances to make one of the blades of greater width than the other where the one blade is to carry a greater load than the other. For the same reason one blade may be made more thick than the other, or one blade may have greater thickness and width than the other. In yet other instances one blade may be longer than the other where a longer bending arm is desired about one axis. In the event blades of unequal length are employed, the shape of the hole is accordingly modified to receive the longer and shorter blades. Instead of a round hole, an oblong-shaped hole may be suitable. It is readily seen that the size of the hole may be varied and its shape may be any one of numerous geometrical designs. Although only two blades are shown disposed within the hole in Figs. 3 and 4, it is easily seen that more than two blades may be used. For example, the blade 16 may be divided into two or more smaller blades separated from one another to avoid frictional losses.

Once the desired number of blades is properly positioned within the grooves, they may be made secure thereto as by brazing or otherwise. Following the brazing, the entire assembly is given the proper heat treatment to develop the required strength of the blade elements. It can be seen that up to this point the initial standard piece of material has remained in one piece, thereby enabling all brazing and heat treating operations to take place without the need of jigs or fixtures to maintain stable geometry.

Figure 3:
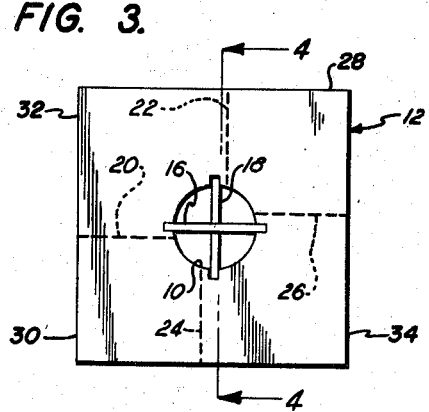

The piece of material 12 is next cut along the lines 20, 22 and 24, 26 in Fig. 3. The corner pieces of material 28 and 30 are thereby removed, and the remaining corner pieces 32 and 34 are secured together by means of the blades 16 and 18. The resulting flexure is illustrated in perspective form in Fig. 5. It can be seen that relative rotation of the remaining corner sections about the central transverse axis of the blades can be achieved by bending of the thin blades, but that the corner sections are otherwise accurately restrained relative to one another. Bolts or screws may be used in the holes 36 and 38 in the corner section 32 in Fig. 5 and in the holes 40 and 42 in the corner section 30 for securely mounting the flexure in position to two members which are to be secured together but which must undergo relative rotational motion with respect to each other.

Figure 6:
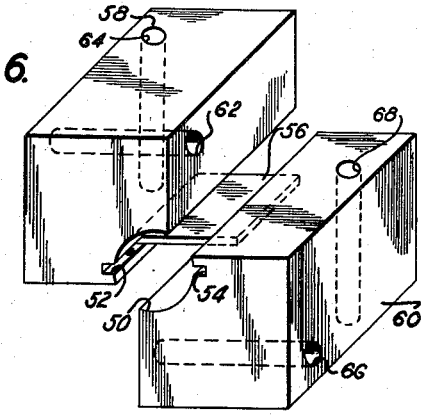
Fig. 6 illustrates in perspective a modification of the flexure in Fig. 5.

The foregoing method may be employed to make other flexures with different shapes, designs and details of construction. In order to illustrate further the versatility of this novel method, the manufacture of a flexure of the type illustrated in Fig. 6 is described. After a hole 50 is formed in a block of material, grooves 52 and 54 are formed in the block preferably in the manner explained above. A single blade member 56 is inserted in the grooves, centrally positioned within the block and secured in the grooves as by brazing. Following brazing the entire assembly is given the proper heat treatment to develop the required strength of the blade element. The upper right and lower left corner portions, not shown, are removed by a cutting operation. Thereupon the upper left corner portion 58 and lower right corner portion 60 are securely joined together by the flexure blade portion 56, and relative rotational movement of the two corner portions shown may take place as the flexible blade member undergoes a bending moment about a transverse axis. Bolts or screws may be used in the holes 62 and 64 of the corner portion 58 and in the holes 66 and 68 of the corner portion 60 to securely mount the flexure to two members which must undergo a relative rotational motion with respect to each other. Thus an improved flexure having only one flexible blade member is obtained by the simple process of the present invention.

Thus it is seen that a unique and novel method for manufacturing flexures is provided which is simple to perform, obviates the need for brazing and heat treating jigs or fixtures, lends itself to mass production techniques, and reduces the costs of manufacture. By this simple process the resulting novel flexure may include one or more flexible supporting blades of similar or varying dimensions disposed between two pieces of material which are to undergo relative rotational movement.

What is claimed is:

1. The method of making flexures comprising the steps of forming a grooved aperture within an appropriately shaped piece of material, securing flexible means to the grooved portion of said aperture, heat treating the entire assembly to achieve the desired strength of the flexible means, dividing said piece of material into two parts by cutting inwardly to the aperture so that the remaining opposing parts are secured to the flexible means.

2. A method for manufacturing flexures comprising the steps of forming a hole in a piece of material, forming grooves in the material along the hole, securing thin blade means in the grooves within the hole, hardening the blade means and cutting away portions of the piece of material to divide the material into portions secured together by the thin blade means so that the blade means may be flexed about a pivot axis when the remaining portions of the material undergo relative motion with respect to each other.

3. A method of making flexures comprising the steps of forming a bore in a piece of material, forming first and second pairs of grooves in the material along the bore, the grooves in each pair being oppositely disposed, securing at least one blade in the first pair of grooves and at least one blade in the second pair of grooves, heat treating the assembly to harden the blades and removing portions of said piece of material which extend to the bore, so that each remaining portion of the material is secured to at least one other remaining portion by at least one blade, whereby the remaining portions are adapted to undergo relative motion with respect to one another by the flexing of said blades.

4. The method of making flexures comprising the steps of forming a grooved bore within a piece of material, securing at least one flexible blade member to the grooves, and cutting away portions of the piece of material which extend inwardly to the bore, to divide the material into at least two portions which are secured together by at least one blade member.

5. The method of making a flexure comprising the steps of forming within a piece of material a bore having a plurality of grooves therealong, securing at least one flexible blade member to the grooves so as to connect the blade member to the material adjacent the respective grooves, and dividing the material into at least two parts so that each part is connected to at least one other part by at least one flexible blade member.

6. A method as described in claim 5 in which the flexible blade member is secured to the grooves by brazing.

References Cited in the file of this patent
UNITED STATES PATENTS

| | | |
|---|---|---|
| 392,617 | Lieb et al. | Nov. 13, 1888 |
| 1,198,314 | Baude | Sept. 12, 1916 |
| 2,611,659 | Hadley | Sept. 23, 1952 |
| 2,694,319 | Johnson | Nov. 16, 1954 |